US008525930B2

(12) United States Patent
Hsieh

(10) Patent No.: US 8,525,930 B2
(45) Date of Patent: Sep. 3, 2013

(54) ELECTRONIC BILLBOARD

(75) Inventor: Kuan-Hong Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 404 days.

(21) Appl. No.: 12/954,542

(22) Filed: Nov. 24, 2010

(65) Prior Publication Data

US 2012/0013806 A1 Jan. 19, 2012

(30) Foreign Application Priority Data

Jul. 15, 2010 (CN) .......................... 2010 1 0226827

(51) Int. Cl.
*H04N 5/445* (2011.01)

(52) U.S. Cl.
USPC .......................................................... 348/581

(58) Field of Classification Search
USPC ................. 348/581, 580, 563–566, 569, 725, 348/553; 345/428, 660; 715/863, 788
See application file for complete search history.

(56) References Cited

U.S. PATENT DOCUMENTS

| | | | | |
|---|---|---|---|---|
| 7,502,036 | B2 * | 3/2009 | Kramer et al. | 345/629 |
| 8,209,635 | B2 * | 6/2012 | Thom | 715/863 |
| 2001/0015792 | A1 * | 8/2001 | Fateh et al. | 351/239 |
| 2005/0229200 | A1 * | 10/2005 | Kirkland et al. | 725/12 |
| 2007/0024841 | A1 * | 2/2007 | Kloza | 356/5.03 |
| 2008/0194275 | A1 * | 8/2008 | Koch et al. | 455/457 |
| 2009/0164896 | A1 * | 6/2009 | Thorn | 715/700 |
| 2010/0002072 | A1 * | 1/2010 | Nagai | 348/36 |
| 2010/0099437 | A1 * | 4/2010 | Moerdijk | 455/457 |
| 2011/0141114 | A1 * | 6/2011 | Chen et al. | 345/428 |
| 2011/0254914 | A1 * | 10/2011 | Ng | 348/14.16 |
| 2011/0292009 | A1 * | 12/2011 | Wang et al. | 345/207 |
| 2011/0298980 | A1 * | 12/2011 | Adhikari et al. | 348/561 |
| 2011/0320116 | A1 * | 12/2011 | DeMaio et al. | 701/201 |
| 2012/0098802 | A1 * | 4/2012 | Woon Feather | 345/204 |
| 2012/0218321 | A1 * | 8/2012 | Ake et al. | 345/690 |
| 2012/0246678 | A1 * | 9/2012 | Barksdale | 725/37 |
| 2012/0314017 | A1 * | 12/2012 | Gross | 348/14.07 |

* cited by examiner

*Primary Examiner* — Paulos M Natnael
(74) *Attorney, Agent, or Firm* — Altis Law Group, Inc.

(57) ABSTRACT

An electronic billboard includes a display unit, a storage unit, a distance detection unit, and a processing unit. The storage unit stores a relationship table recording a relation between viewer distances and zoom proportions of displayed content by the display unit. The distance detection unit detects viewer distances of viewers. The processing unit controls a display mode of the display unit according to a comparison result of a viewer distance with a predetermined distance.

12 Claims, 3 Drawing Sheets

31

| Viewer distances | Zoom proportions |
|---|---|
| Less than 3 meters | 1/4 |
| 3 to 7 meters | 1/3 |
| 7 to 13 meters | 1/2 |
| 13 to 20 meters | 3/4 |
| More than 20 meters | 1/1 |

FIG. 2

ELECTRONIC BILLBOARD

BACKGROUND

1. Technical Field

The present disclosure relates to electronic billboards and, particularly, to a electronic billboard with touch panel.

2. Description of Related Art

One of the best ways to win customers is through advertising. Electronic billboards are a popular venue for showing advertising. However, the electronic billboards generally show contents on a full screen, no matter how far away viewers are, after a while this becomes boring for the viewers. Furthermore, the electronic billboards also cannot interact with viewers.

BRIEF DESCRIPTION OF THE DRAWINGS

The components of the drawings are not necessarily drawn to scale, the emphasis instead being placed upon clearly illustrating the principles of an electronic billboard. Moreover, in the drawings, like reference numerals designate corresponding parts throughout several views.

FIG. 2 is an exemplary relationship table employed in the electronic billboard of FIG. 1.

DETAILED DESCRIPTION

Figure 1:
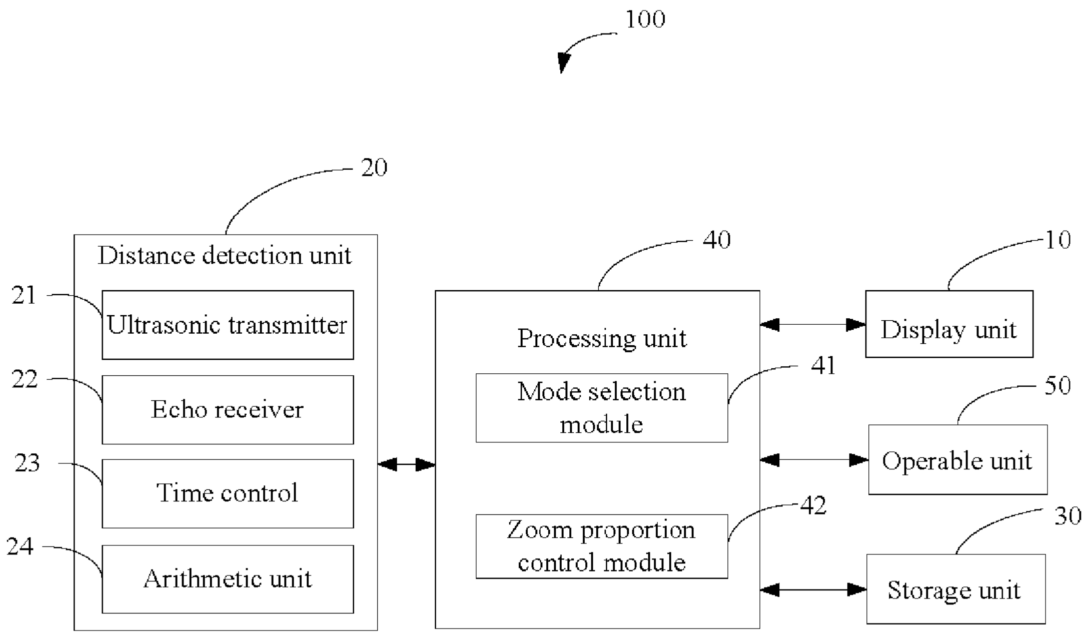
FIG. 1 is a block diagram of the electronic billboard in accordance with an exemplary embodiment.

FIG. 1 is a block diagram of an electronic billboard 100, in accordance with an embodiment. The electronic billboard 100 includes a display unit 10, a distance detection unit 20, a storage unit 30, a processing unit 40, and an operable unit 50.

The distance detection unit 20 is used to detect distances between viewers and the electronic billboard 100 (hereinafter "the viewer distances") within the detectable range of the distance detection unit 20. In this embodiment, the distance detection unit 20 is an ultrasonic ranging sensor. The ultrasonic ranging sensor includes an ultrasonic transmitter 21, an echo receiver 22, a time control 23, and an arithmetic unit 24. The ultrasonic transmitter transmits 21 ultrasonic waves for every time period T. The time period T is preset to be longer than the time needed by the ultrasonic waves traveling from the ultrasonic transmitter 21 to a viewer, and back to the echo receiver 22 when the viewer distance of the viewer is the longest in the detectable range. The time control 23 records a time point for the ultrasonic waves that are being transmitted and a time point for the ultrasonic waves that are being received to obtain a time duration of the ultrasonic waves travelling from the ultrasonic transmitter to the echo receiver. The arithmetic unit 24 based on the time duration can calculate the measured distance.

The storage unit 30 stores content for the electronic billboard 100 to display and a relationship table. The relationship table records a relation between viewer distances and zoom in or zoom out proportions of displayed content (hereinafter "the zoom proportions"). Referring to FIG. 2, each of the zoom proportions corresponds to a viewer distance range. In other embodiments, the storage unit 30 stores a formula defining the relation between zoom proportion and viewer distance. For example, the formula defines a linearly direct ratio relation between zoom proportion and viewer distance.

The processing unit 40 includes a mode selection module 41 and a zoom proportion control module 42. The mode selection module is used to select a display mode according to a comparison result of a viewer distance with a predetermined distance. The zoom proportion control module 42 is used to control the display unit 10 to display contents with a zoom in or zoom out proportion corresponding to the viewer distance according to the relationship table. In this embodiment, the modes include a zoom mode and an interactive mode. The mode selection module 41 chooses the interactive mode when at least one of the detected viewer distances is less than the predetermined distance, and chooses the zoom mode when the detected viewer distances is greater than or equal to the predetermined distance.

Figure 3:
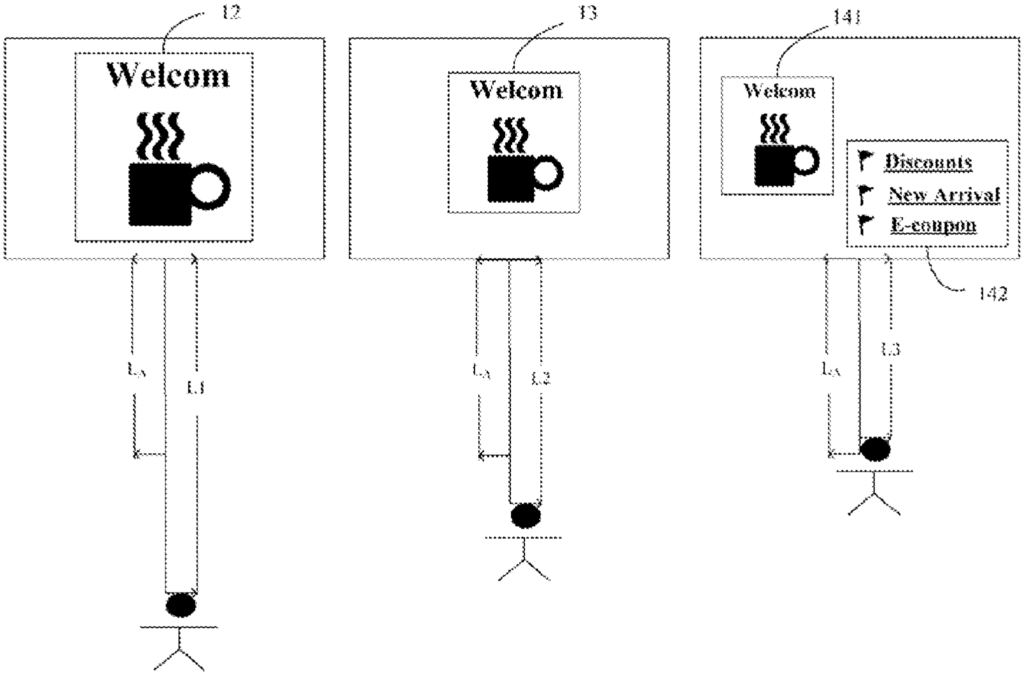
FIG. 3 is a schematic diagram showing content changes on the electronic billboard of FIG. 1 relating to distances of viewers

FIG. 3 is a schematic diagram showing content changes in three different viewer distances. First, the viewer stops relatively far from the electronic billboard 100 and the viewer distance $L_1$ of this viewer is farther than the predetermined distance $L_A$, the mode selection module 41 sends a zoom mode displaying instructions to the zoom proportion control module 42. The zoom proportion control module 42 drives the display unit 10 to display the content with a zoom proportion corresponding to the viewer distance $L_1$ according to the relationship table.

When the viewer moves towards the electronic billboard 100, and the viewer distance changes to $L_2$, the zoom proportion control module 42 drives the display unit 10 to display content with another zoom proportion corresponding to the viewer distance $L_2$ according to the relationship table. The zoom proportion decreases when the viewer moves towards the electronic billboard 100.

When the viewer moves to a viewer distance $L_3$ less than the predetermined distance $L_A$, the processing unit 40 sends an interactive mode displaying instructions to the zoom proportion control module 42, the zoom proportion control module 42 drives the display unit 10 to display an interactive interface, and activates the operable unit 50 for viewers to operate. The operable unit 50 can be a touch panel, a mouse, five keys control, a keyboard, or a gesture control. In this embodiment, the display unit 10 is divided into two areas. The first area 141 displays content with zoom mode and the second area 142 displays an operable interface with interactive mode. The viewer can operate the operable unit 50 to get useful information, such as discounts or new arrivals from the operable interface.

In other embodiments, when there are more than one detected viewer distances longer than the predetermined distance $L_A$, the zoom proportion control module 42 computes the average of the viewer distances, and drives the display unit to display content with a zoom proportion corresponding to the average according to the relationship table.

The zoom proportion control module 42 drives the display unit 10 to display the largest zoom proportion when there is no viewer in the detectable range.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic billboard comprising:

a display unit;

a storage unit storing a relationship table recording a relation between viewer distances and zoom proportions of displayed content by the display unit;

a distance detection unit configured to detect viewer distances of viewers; and a processing unit comprising:

a mode selection module configured to select a display mode according to a comparison result of the viewer distance with a predetermined distance, the display mode being selected from a group consisting of a zoom mode and an interactive mode, and a zoom proportion control module configured to control the display unit to display contents in the selected mode corresponding to the viewer distance according to the relationship table.

2. The electronic billboard as claimed in claim 1, wherein the processing unit controls the display unit to be in the zoom mode when the detected viewer distance is greater than the predetermined distance, in the zoom mode the display unit displays contents with a zoom proportion corresponding to the viewer distance according to the relationship table.

3. The electronic billboard as claimed in claim 1, wherein the processing unit controls the display unit to be in the interactive mode when at least one of the detected viewer distances is less than the predetermined distance, in the interactive mode the display unit displays a user interface for receiving viewers' input.

4. The electronic billboard as claimed in claim 3, further comprising an operable unit for assisting viewers' input, the operable unit is operable only in the interactive mode.

5. The electronic billboard as claimed in claim 2, wherein when there are more than one detected viewer distances longer than the predetermined distance, the processing unit computes the average of the viewer distances, and drives the display unit to display content with a zoom proportion corresponding to the average according to the relationship table.

6. The electronic billboard as claimed in claim 4, wherein the operable unit is one selected from the group consisting a touch panel, a mouse, five keys control, a keyboard, and a gesture control.

7. The electronic billboard as claimed in claim 1, wherein the processing unit controls the display unit to display content with the preset largest zoom proportion when there is no viewer.

8. The electronic billboard as claimed in claim 1, wherein the display unit is divided into two areas, one area is in the zoom mode and the other area is in the interactive mode.

9. The electronic billboard as claimed in claim 1, wherein the relation recorded by the relationship table is a formula defining the relation between zoom proportion and viewer distance.

10. The electronic billboard as claimed in claim 9, wherein the formula defines a linearly direct ratio relation between zoom proportion and viewer distance.

11. An electronic billboard comprising:

a display unit;

a storage unit storing a relationship table recording a relationship between viewer distances and zoom proportions of displayed content by the display unit;

a distance detection unit configured to detect viewer distances of viewers;

a processing unit comprising:

a mode selection module configured to select a display mode according to a comparison result of the viewer distance with a predetermined distance, the display mode being selected from a group consisting of a zoom mode and an interactive mode, and a zoom proportion control module configured to control the display unit to display contents in the selected mode corresponding to the viewer distance according to the relationship table.

12. The electronic billboard as claimed in claim 11, wherein the determined viewer distance is the average of the viewer distances.

* * * * *